United States Patent [19]

Kuo

[11] Patent Number: 5,324,788
[45] Date of Patent: Jun. 28, 1994

[54] THERMOSETTING COATING COMPOSITIONS

[75] Inventor: Thauming Kuo, Kingsport, Tenn.

[73] Assignee: Eastman Kodak Company, Rochester, N.Y.

[21] Appl. No.: 54,481

[22] Filed: Apr. 30, 1993

[51] Int. Cl.$^5$ ............... C08F 8/12; C08F 218/00; C08G 12/32
[52] U.S. Cl. .............. 525/329.5; 525/333.3; 525/384; 526/326; 524/564
[58] Field of Search ............. 525/329.5, 333.3, 384; 526/326; 524/564

[56] References Cited

U.S. PATENT DOCUMENTS

| | | | |
|---|---|---|---|
| 4,137,279 | 1/1979 | Smith et al. | 525/411 |
| 4,678,843 | 7/1987 | Elmore et al. | 525/329.5 |
| 4,857,601 | 8/1989 | Gupta | 525/344 |
| 4,898,916 | 2/1990 | Gupta | 525/355 |
| 5,106,651 | 4/1992 | Tyger et al. | 427/54.1 |

FOREIGN PATENT DOCUMENTS

0419088A1 3/1991 European Pat. Off. .
0466359A2 1/1992 European Pat. Off. .

OTHER PUBLICATIONS

Masao Kato, J. of Polymer Science, Part A-1, vol. 7, 2405-2410 (1969).
Masao Kato, J. of Polymer Science, Part A-1, vol. 7, 2175-2184 (1969).
J. M. J. Frechet et al., Macromolecules, 1991, 24, 1746-1754.
Paolo Ferruti and Angelino Fere, J. of Polymer Science, Part A-1, vol. 9, 3671-3673 (1971).

*Primary Examiner*—Paul R. Michl
*Assistant Examiner*—Andrew E. C. Merriam
*Attorney, Agent, or Firm*—Bernard J. Graves, Jr.

[57] ABSTRACT

Provided are enamel compositions and water-borne enamel compositions comprising phenol functionalized vinyl polymers and crosslinking agents such as aminoplasts, e.g., alkylated melamine-formaldehyde condensates. The coatings produced from such compositions possess excellent acid-etch resistance, solvent resistance, hardness, and gloss. The compositions of the present invention are thus particularly useful for automotive, appliance and machinery coatings.

25 Claims, No Drawings

THERMOSETTING COATING COMPOSITIONS

FIELD OF THE INVENTION

This invention belongs to the field of vinyl polymers. In particular, this invention relates to phenol-functionalized vinyl polymers which are useful as binders in enamel compositions.

BACKGROUND OF THE INVENTION

There is a need in the coatings industry for high strength, high modulus, chemically resistant coatings. This invention is directed toward meeting the above needs and the coatings described herein exhibit improvements in one or more specific properties of acid resistance, pencil hardness, solvent resistance, gloss, etc.

EP-A 466,359 discloses a process for preparing phenol functionalized polymers by the polymerization of 4-acetoxystyrene and copolymerization of 4-acetoxystyrene and additional vinyl comonomers such as acrylates followed by transesterification with an alcohol. The polymers are taught to be useful as photoresist components for use in combination with UV, X-ray and E-beam imaging systems. Similarly, U.S. Pat. No. 4,857,601 discloses a process for preparing copolymers of 4-acetoxystyrene and dialkyl muconates or alkyl sorbates, followed by an alcohol or aqueous treatment with acid or base to provide the final phenol functionalized polymer.

U.S. Pat. No. 5,106,651 discloses a method for preparing coatings consisting of applying a film forming composition containing an active hydrogen-containing polymer and an aminoplast curing agent to form a coated article. No phenol functionalization is disclosed and only aliphatic hydroxy and carboxylic acid active hydrogen groups are mentioned. Further, these compositions require an additional exposure to UV radiation to produce enamels having good resistance to acid etching and water spotting.

EP-A 419,088 discloses non liquid crystalline, ester phenol capped polymers and such polymers crosslinked with aminoplast curing agents to give enamel coatings. In these compositions, the phenol moiety is always linked to the polymer through an ester group prepared by reacting polymers containing aliphatic hydroxy groups with hydroxybenzoic acids. This reference teaches that the polymers may be polyesters, alkyds, acrylics, or epoxy resins.

Additional linear, high molecular weight, phenol functionalized polymers have been prepared by polymerization of hydroxystyrenes in the presence of cationic catalysts [Masao Kato, J. of Polymer Science, Part A-1, Vol. 7, 2405–2410 (1969)]. Also, hydroxystyrenes have been copolymerized with other vinyl monomers such as acrylate esters in the presence of free radical initiators to produce phenol functionalized polymers [Masao Kato, J. of Polymer Science, Part A-1, Vol. 7, 2175–2184 (1969)]. Further, phenol functionalized polymers have been produced by radical catalyzed copolymerization of 4-(acetoxymethyl) styrene and 4-(t-butyloxycarbonyloxy) styrene followed by removal of the t butyloxycarbonyl groups from the polymer (J.M.J. Frechet, et al., Macromolecules, 1991, 24, 1746–1754). Poly(4-hydroxystyrene) has also been prepared from poly(4-vinylphenyl benzyl ether) followed by cleavage of the benzyl ether groups on the polymer by hydrobromic acid (Paolo Ferruti and Angelino Fere, J. of Polymer Science, Part A1, Vol. 9, 3671–3673 (1971)).

SUMMARY OF THE INVENTION

This invention provides novel enamel compositions comprising phenol functionalized vinyl polymers and crosslinking agents such as aminoplasts, e.g., alkylated melamine-formaldehyde condensates. The enamel coatings produced from said enamel compositions have excellent acid-etch resistance, solvent resistance, hardness, and gloss. The compositions of the present invention are thus particularly useful for coating automotive, appliance and machinery parts.

DETAILED DESCRIPTION OF THE INVENTION

This invention provides novel enamel compositions comprising phenol functionalized vinyl polymers and crosslinking agents contained in organic solvents or aqueous media (water borne) which provide enamel compositions having excellent properties when cured. In addition, the enamels have improved stability at room temperature.

The phenol functionalized vinyl polymers of the present invention are characterized by the presence of phenol functional moieties

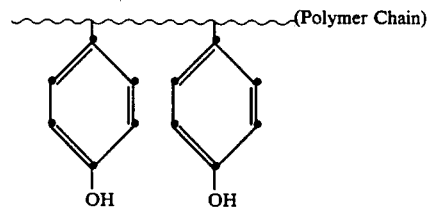

randomly present on the linear polymer chain. Other conventional and more economical vinyl comonomers such as acrylates, methacrylates, styrenes, etc. can be used to produce a major portion of the polymer backbone. The phenol functionalized vinyl polymers are crosslinked by treating with crosslinking agents, such as aminoplasts, to produce the thermosetting or heat cured enamel coatings. Aminoplasts are aldehydes condensation products of amines or amides, such as melamine. To provide the most economical coating composition, it may be desirable to use only enough phenol functional moieties to provide adequate crosslinking upon curing in the presence of the aminoplast crosslinking agents.

To facilitate curing, the enamel compositions preferably contain acid catalysts such as sulfonic acids, e.g., p toluenesulfonic acid, dodecylbenzene sulfonic acid; acid phosphates, e.g., phenyl acid phosphate, etc. The amount of catalyst present is preferably from about 0.05 to 5 percent based on the total weight of the binder, i.e., the weight of the resin and crosslinker combined.

Thus, the present invention provides an enamel composition comprising
(I) about 25 to about 65 wt %, based on the total weight of components (I), (II) and (III), of a phenol functionalized vinyl polymer having a number average molecular weight of about 1000 to about 50,000 and a weight average molecular weight of about 5,000 to about 100,000, said phenol functionalized vinyl polymer prepared by polymerization of the following vinyl components:
(a) about 5 to about 80 wt % of a 4-acyloxystyrene compound of Formula A,

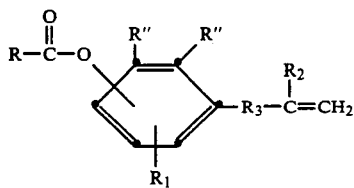 (A)

wherein R is selected from hydrogen, $C_1$-$C_6$-alkyl, $C_1$-$C_6$-alkoxy, $C_5$-$C_7$-cycloalkyl, aryl, aryloxy, $C_1$-$C_6$-alkylamino and arylamino; $R_1$ is selected from hydrogen, $C_1$-$C_6$-alkyl, $C_1$-$C_6$-alkoxy and halogen; $R_2$ is hydrogen or methyl; and $R_3$ is a covalent bond or is selected from a group of the formulae —$(CHR')_n$—, —O—, —S—, —C(O)—, —OC(O)—, —C(O)O—, —C(O)—O$(CH_2)_n$—O—C(O)—, and —NH—C(O)—, wherein R' is hydrogen or a group of the formula R—C(O)O-phenyl- or R—C(O)O—naphthyl-; each R" is hydrogen or both R" are taken together to form a group of the formula

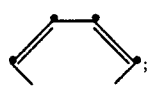

and n is an integer of from 1 to 10;

(b) about 0 to about 50 wt % of a styrene compound of Formula B, and/or an acylated vinyl alcohols of Formula C,

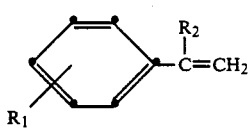 (B)

 (C)

wherein R, $R_1$ and $R_2$ are as defined above;

(c) about 20 to about 90 wt % of an acrylate monomer of Formula D,

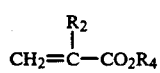 (D)

wherein $R_2$ is as defined above and $R_4$ is selected from $C_1$-$C_{12}$-alkyl; $C_5$-$C_7$-cycloalkyl; $c_1$-$C_{12}$-alkyl substituted by one or more groups selected from $C_1$-$C_6$-alkoxy, $C_5$-$C_7$-cycloalkyl, hydroxy, acetoacetoxy, aryl, furyl, tetrahydofuryl and —N($R_5$)$R_6$ wherein $R_5$ and $R_6$ are independently selected from $C_1$-$C_6$-alkyl or hydrogen; and (d) about 0 to about 20 wt % of acrylic acid and/or methacrylic acid, the total of (a), (b), (c) and (d) being 100%, said polymerization folowed by transesterification with an alcohol to convert acyloxyphenyl groups on the polymer to the phenol functionalized vinyl polymer;

(II) about 5 to about 20 wt % of an amino crosslinking agent, based on the total weight of I, II and III; and (III) about 20 to about 70 wt % of an organic solvent, based on the total weight of (I), (II) and (III), the total of (I), (II), and (III) being 100%.

As a further aspect of the present invention, there is provided a water borne enamel composition comprising (I) about 25 to about 65 wt %, based on the total weight of components (I), (II), (III), (IV) and (V), of a phenol functionalized vinyl polymer having a number average molecular weight of about 1000 to about 50,000 and a weight average molecular weight of about 5,000 to about 100,000, said phenol functionalized vinyl polymer prepared by polymerization of the following vinyl components:

(a) about 5 to about 80 wt % of a 4-acyloxystyrene compound of Formula A,

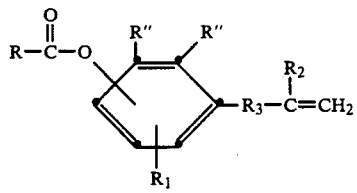 (A)

wherein R is selected from hydrogen, $C_1$-$C_6$-alkyl, $C_1$-$C_6$-alkoxy, $C_5$-$C_7$-cycloalkyl, aryl, aryloxy, $C_1$-$C_6$-alkylamino and arylamino; $R_1$ is selected from hydrogen, $C_1$-$C_6$-alkyl, $C_1$-$C_6$-alkoxy and halogen; $R_2$ is hydrogen or methyl; and $R_3$ is a covalent bond or is selected from a group of the formulae —$(CHR')_n$—, —O—, —S—, —C(O)—, —OC(O)—, —C(O)O—, —C(O)—O$(CH_2)_n$—O—C(O)—, and —NHC(O)—, wherein R' is hydrogen or a group of the formula R—C(O)O-phenyl-, or R—C(O)O-naphthyl, each R" is hydrogen or both R" are taken together to form a group of the formula

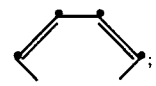

and n is an integer of from 1 to 10;

(b) about 0 to about 50 wt % of a styrene compound of Formula B, and/or an acylated vinyl alcohol of Formula C,

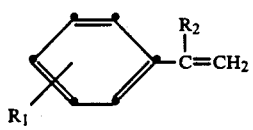 (B)

 (C)

wherein R, $R_1$ and $R_2$ are as defined above;

(c) about 20 to about 90 wt % of an acrylate monomer of Formula D,

(D)

wherein $R_2$ is as defined above and $R_4$ is selected from $C_1$-$C_{12}$-alkyl; $C_5$-$C_7$-cycloalkyl; $C_1$-$C_{12}$-alkyl substituted by one or more groups selected from $C_1$-$C_6$-alkoxy, $C_5$-C-cycloalkyl, hydroxy, acetoacetoxy, aryl, furyl, tetrahydofuryl and $-N(R_5)R_6$ wherein $R_5$ and $R_6$ are independently selected from $C_1$-$C_6$-alkyl or hydrogen; and (d) about 0 to about 20 wt % of acrylic acid and/or methacrylic acid, said polymerization followed by tranesterification with an alcohol to convert the acyloxyphenyl groups on the polymer to the phenol functionalized vinyl polymer (I);

(II) about 0 to about 30 wt % of a water-miscible organic solvent, based on the total weight of I, II, III, IV and (V);

(III) about 30 to about 70 wt % of water, based on the total weight of (I), (II), (III), (IV) and (V);

(IV) about 5 to about 20 wt % of a crosslinking agent, based on the total weight of (I), (II), (III), (IV) and (V);

(V) about 0.5 to about 3 wt % of an amine, based on the total weight of (I), (II), (III), (IV), and (V), wherein said amine is reacted directly with said vinyl polymer (I).

In an especially preferred embodiment of the present invention, in the compound of formula (A), $R_3$ is a covalent bond or is selected from a group of the formulae $-(CHR')_n-$, $-O-$, $-S-$, $-C(O)-$, and $-OC(O)-$, wherein R' is hydrogen or a group of the formula R—C(O)O-phenyl- and n is an integer of from 1 to 10.

As used herein, the term "acyl" is used to include the reactive residues of carboxylic acids, carboxylic acid esters, carboxylic acid halides, carboxylic acid anhydrides and isothoscyanates, for example, formyl, acetoacetyl, $C_1$-$C_6$-alkylaminocarbonyl, $C_5$-$C_7$-cycloalkylcarbonyl, aroyl (arylcarbonyl), aroyloxycarbonyl and arylaminocarbonyl. The preferred "acyl" group is $C_1$-$C_6$-alkylcarbonyl, especially acetyl.

In the terms "$C_1$-$C_6$-alkyl" and "$C_1$-$C_8$alkyl" the alkyl groups may optionally contain one to three substituents selected from hydroxy, halogen, $C_1$-$C_6$-alkoxy, aryl, $C_1$-$C_6$-cycloalkyl, cyano, etc.

Examples of groups within the term "aryl" include phenyl, 2(3) furyl and 2(3) thienyl and such groups containing one to three substituents selected from $C_1$-$C_6$-alkyl, $C_1$-$C_6$-alkoxy, or halogen.

The term "$C_5$-$C_7$-cycloalkyl" is used to include cyclopentyl, cyclohexyl, cycloheptyl and such groups substituted one to three times with $C_1$-$C_6$-alkyl, $C_1$-$C_6$-alkoxy or halogen.

Preferred process steps for providing the hydroxy functionalized vinyl polymer are as follows:

(a) reacting a mixture comprising one or more 4-acyloxystyrenes, one or more acrylate esters, and optionally one or more styrene or vinyl acrylate comonomers, in the presence of a free radical initiator and (b) subsequently transesterifying the acyloxy groups present on the vinyl polymer thus produced in (a) by reacting with alcohols to produce the desired phenol functionalized resins.

Various types of free radical initiators are known in the art such as peroxides, e.g., benzoyl peroxide, persulfates, e.g., sodium persulfate, perborates, permanganates and aliphatic azo compounds, e.g., azobisisobutyronitrile and 2,2' azobis(2,4-dimethyl valeronitrile, and the like, which are widely used.

The tranesterification step (b) may be conveniently carried out by treating the polymer prepared in step (a) with one or more alcohols which provide an acceptable transesterification rate; primary alcohols are preferred. Transesterification catalysts may also be used to facilitate the reaction. Typical catalysts include organic sulfonic acids, e.g., p-toluene sulfonic acid, butylstannoic acid, titanium alkoxides, e.g., titanium tetraisopropoxide, acylated zinc hydroxides, e.g., zinc acetate, etc. It is preferred that primary $C_1$-$C_6$-alcohols are used and that the reaction be done under atmospheric pressure; however, with the more volatile alcohols such as methanol, pressure reactors may be employed as needed to achieve the desired temperature and rate of transesterification. In one desirable modification, the transesterification step (b) is accomplished in the same alcohol present in step (a). The transformation of aceloxyphenyl groups into hydroxyphenyl groups is evidenced by analysis of the infrared spectra.

Although the vinyl polymerization may be carried out in a variety of polar solvents including alcohols, ketones, e.g., methyl ethyl ketone and methyl n-amyl ketone, CELLOSOLVES ™, e.g., methyl Cellosolve (2-methoxyethanol) and cyclic ethers such as 1,4-dioxane and tetrahydrofuran, alcohols are preferred and butanols are particularly preferred. Non polar solvents such as toluene, xylene, cyclohexane, hexane and heptane may also be present, preferably at less than 25% by weight of the reaction mixture.

The molecular weight of the polymer in step (a) is controlled by the presence of small amounts of chain transfer agents such as alkyl mercaptans. Also, the polar solvents used, particularly the alcohols or tetrahydrofuran, may serve as chain transfer agents.

Typically, styrene compounds of Formula B include styrene, α-methyl styrene, 4-isopropyl styrene, 2-, 3- or 4-methylstyrene, 2-, 3- or 4-chlorostyrene and 2-, 3- or 4-methoxystyrene and styrene itself is especially preferred.

Typical acylated vinyl alcohols of Formula C above include vinyl acetate, vinyl propionate, vinyl butyrate, 2-ethyl cyanate, vinyl pivalate (available from Unin Carbide Co.), and the like. Vinyl acetate is highly preferred.

Examples of preferred acrylate esters of Formula D include methyl acrylate, methyl methacrylate, ethyl acrylate, ethyl methacrylate, n-butyl acrylate, n-propyl methacrylate, n-butyl methacrylate, isobutyl methacrylate, benzyl acrylate, 4 methyl benzyl methacrylate, furyl acrylate, methyl furyl acetate, 2-(2-thienyl) ethyl acrylate, n-hexyl acrylate, isoamyl methacrylate, 2-(hydroxyethyl) acrylate, 2-(hydroxyethyl) methacrylate, 3-(hydroxypropyl) methacrylate, 2-(ethoxyethyl) acrylate, 2-(methoxyethyl) methacrylate, glycidyl methacrylate, 2-ethylhexyl acrylate, cyclopentyl acrylate, cylohexylmethyl methacrylate, cyclohexyl methacrylate, lauryl acrylate, lauryl methacrylate, stearyl methacrylate, stearyl acrylate, octyl acrylate, octyl methacrylate, tetrahydrofurfuryl acrylate, furfuryl methacrylate, 2-(acetoxyethyl) acrylate, 3-(acetoxypropyl) methacrylate, 2-(dimethylaminoethyl) acrylate, 3-(dimethylaminopropyl) methacrylate, acetoacetoxyethyl acrylate, acetoacetoxyethyl methacrylate, aceto-acetoxypropyl acrylate, and acetoacetoxypropyl methacrylate.

In the preparation of the water-borne enamel compositions above, the curable acrylic polymer is treated directly with an amine to render the resin water dispersible. Typical amines include ammonia, triethylamine, diethylamine, monoethanolamine, monoisopropanolamine, morpholine, ethanolamine, diethanolamine, triethanolamine, N,N-dimethyl ethanolamine, N,N-diethyl ethanolamine, N-methyl-diethanolamine and the like. As noted above, the curable acrylic resins of the present invention possess phenol functional groups which are sufficiently acidic to react directly with the amine. However, resins with a carboxylic acid number of 20-40 mg KOH/g are preferred. The acid number of the resins may be controlled by the amount of acrylic acid and/or methacrylic acid resin used in the formulations. The conventional carboxyl-enrichment-amine-neutralization method has already been described by others in considerable detail (see, for example, Olding and Hayward, Ed., "Resins for Surface Coatings", Volume III, SITA Technology, London, 1987, p 182).

It will be appreciated, of course, that in the above description and as described below, the various mole and weight percentages in the compositions herein will always total 100 percent.

Suitable solvents for the curable enamel composition include xylenes, cyclohexanone, ketones, (for example, methyl amyl ketone), 2-butoxyethanol, ethyl-3-ethoxypropionate (EEP), toluene, n-butanol, and other volatile inert solvents typically used in industrial baking (i.e., thermosetting) enamels.

Suitable co-solvents for the water-borne compositions of the present invention include ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diacetone alcohol, and other water-miscible solvents.

The "amino cross-linking agent" is preferably a melamine-formaldehyde type cross-linking agent, i.e., a cross-linking agent having a plurality of —N(CH$_2$OR$^3$)$_2$ functional groups, wherein R$^3$ is C$_1$-C$_4$ alkyl or hydrogen, preferably methyl.

The cross-linking agent may also be a modified melamine-formaldehyde type resin such as toluene sulfonamide modified melamine-formaldehyde resins, and the like.

In general, the cross-linking agent may be selected from compounds of the following formulae, wherein R$^3$ is independently C$_1$-C$_4$ alkyl or hydrogen:

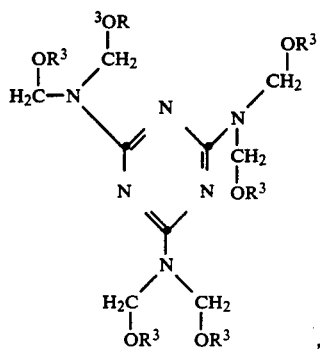

-continued

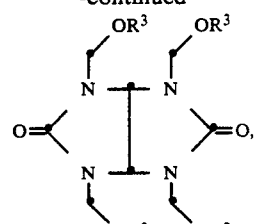

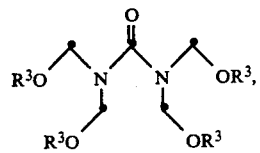

or

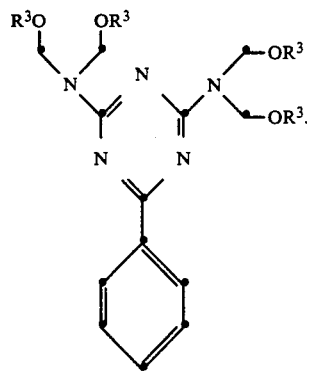

In this regard, preferred cross linking agents include hexamethoxymethylmelamine, tetramethoxymethylbenzoguanamine, tetramethoxymethylurea, mixed butoxy/methoxy substituted melamines, and the like. The most preferred cross linking agent is hexamethoxymethylmelamine.

As a further aspect of the present invention, there is provided a curable enamel composition further comprising one or more cross-linking catalysts. Examples of such catalysts include p-toluenesulfonic acid, the NACURE ™ 155, 5076, 1051, 5225, 4167, and 2547 catalysts sold by King Industries, BYK ® Catalyst 450, 470, available from BYK-Chemie U.S.A., methyl tolyl sulfonimide, and the like.

As a further aspect of the present invention there is provided a cross-linkable enamel composition as described above, further comprising one or more leveling, rheology, and flow control agents such as silicones, fluorocarbons or cellulosics; flatting agents; pigment wetting and dispersing agents; surfactants; ultraviolet (UV) absorbers; UV light stabilizers; tinting pigments; defoaming and antifoaming agents; anti-settling, anti-sag and bodying agents; anti-skinning agents; anti-flooding and anti-floating agents; fungicides and mildewicides; corrosion inhibitors; thickening agents; or coalescing agents.

Specific examples of such additives can be found in *Raw Materials Index*, published by the National Paint & Coatings Association, 1500 Rhode Island Avenue, N.W., Washington, D.C. 20005.

Examples of flatting agents include synthetic silica, available from the Davison Chemical Division of W.R. Grace & Company under the trademark SYLOID ®;

polypropylene, available from Hercules Inc., under the trademark HERCOFLAT ®; synthetic silicate, available from J.M. Huber Corporation under the trademark ZEOLEX ®.

Examples of dispersing agents and surfactants include sodium bis(tridecyl) sulfosuccinnate, di(2-ethyl hexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetrasodium N-(1,2 dicarboxy-ethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include polyaminoamide phosphate, high molecular weight carboxylic acid salts of polyamine amides, and alkyl amine salt of an unsaturated fatty acid, all available from BYK Chemie U.S.A. under the trademark ANTI TERRA ®. Further examples include polysiloxane copolymers, polyacrylate solution, cellulose esters, hydroxyethyl cellulose, hydrophobically-modified hydroxyethyl celuulose, hydroxypropyl cellulose, polyamide wax, polyolefin wax, carboxymethyl cellulose, ammonium polyacrylate, sodium polyacrylate, and polyethylene oxide.

Several proprietary antifoaming agents are commercially available, for example, under the trademark BRU-BREAK of Buckman Laboratories Inc., under the BYK ® trademark of BYK Chemie, U.S.A., under the FOAMASTER ® and NOPCO ® trademarks of Henkel Corp./Coating Chemicals, under the DREW-PLUS ® trademark of the Drew Industrial Division of Ashland Chemical Company, under the TROYSOL ® and TROYKYD ® trademarks of Troy Chemical Corporation, and under the SAG ® trademark of Union Carbide Corporation.

Examples of fungicides, mildewicides, and biocides include 4,4-dimethyloxazolidine, 3,4,4-trimethyloxazolidine, modified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include substituted benzophenones, substituted benzotriazoles, hindered amines, and hindered benzoates, available from American Cyanamid Company under the tradename Cyasorb UV, and available from Ciba Geigy under the tradename Tinuvin, and diethyl-3-acetyl-4-hydroxy-benzyl-phosphonate, 4-dodecyloxy-2-hydroxy benzophenone, and resorcinol monobenzoate.

Such paint or coating additives as described above form a relatively minor proportion of the enamel composition, preferably about 0.05 weight % to about 5.00 weight %.

As a further aspect of the present invention, there is provided a curable enamel composition optionally containing one or more of the above-described additives, further comprising one or more pigments.

Pigments suitable for use in the enamel compositions envisioned by the present invention are the typical organic and inorganic pigments, well-known to one of ordinary skill in the art of surface coatings, especially those set forth by the *Colour Index*, 3d Ed., 2d Rev., 1982, published by the Society of Dyers and Colourists in association with the American Association of Textile Chemiss and Colorists. Examples include but are not limited to the following: CI Pigment White 6 (titanium dioxide); CI Pigment Red 101 (red iron oxide); CI Pigment Yellow 42, CI Pigment Blue 15, 15:1, 15:2, 15:3, 15:4 (copper phthalocyanines); CI Pigment Red 49:1, and CI pigment Red 57:1.

Upon formulation as described above, the curable enamel composition is then applied to the desired substrate or article, e.g., steel, aluminum, or galvanized sheeting (either primed or unprimed), heated (i.e., cured) to a temperature of about 130° C. to about 175° C., for a time period of 5-60 minutes and subsequently allowed to cool. Thus, as a further aspect of the present invention, there is provided a shaped or formed article which has been coated with the thermo-setting coating compositions of the present invention and cured.

Further examples of typical application and curing methods can be found in U.S. Pat. Nos. 4,737,551 and 4,698,391, incorporated herein by reference.

As a further aspect of the present invention, there is provided a coating which results from the application and curing of the curable enamel composition as set forth above.

The following examples illustrate further the practice of the invention.

EXPERIMENTAL SECTION

Example 1—Polymerization of Vinyl Monomers

In a 500 mL round-bottom flask equipped with a water condenser were mixed with stirring the following compounds: methyl methacrylate (25 g), n-butyl acrylate (25 g), styrene (25 g), 4-acetoxystyrene (26.1 g), tert-dodecanethiol (0.2 g), and n-butanol (90 g). The mixture was then heated to about 100° C. and the stirring continued. A solution of initiator, azobisisobutyronitrile (AIBN) (2.0 g), dissolved in n-butanol (10 g) was prepared. This initiator suspension was added sequentially to the reaction mixture every 0.5 hr in three portions. The polymerization was complete after refluxing at 100° C. for four hours by determining the percent solids of the reaction mixture. The resulting resin solution turned white upon cooling.

Example 2—Transesterification of Acetoxyphenl Groups on the Resin of Example 1

To a portion (100 g) of the above resin solution was added FASCAT 4100 catalyst (0.1 g) (Atochem North America, Inc.) and the mixture refluxed at 110° C. for 15 hours to complete the transesterification. To this mixture was added xylnne (20 g) and the temperature raised to 135° C. in order to distill off about 50 mL of the solvents. The resulting resin 1 was collected and determined to have 66% solids.

Example 3—Synthesis of Resin 2

In a 500 mL round bottom flask equipped with a water condenser were mixed with stirring the following compounds: methyl methacrylate (25 g), n-butyl acrylate (25 g), styrene (25 g), 4-acetoxystyrene (13 g), 2-hydroxyethyl methacrylate (9 g), tert-odecanethiol (0.2 g), and n-butanol (85 g). The mixture was then heated to about 100° C. and the stirring continued. A solution of initiator, azobisisobutyronitrile (AIBN) (3.0 g), dissolved in n-butanol (15 g) was prepared. This initiator suspension was added sequentially to the reaction mixture every 0.5 hour in three portions. The polymerization was complete after refluxing at 100° C. for three hours by determining the percent solids of the reaction mixture.

To the above resin solution was added FASCAT 4100 (0.2 g) and the mixture refluxed at 110° C. for 15 hours to complete the transesterification. To this mixture was added xylene (40 g) and the temperature raised to 135° C. in order to distill off about 123 mL of the solvents. The resulting resin 2 was collected and determined to have about 70% solids.

Example 4—Synthesis of Resin 3

In a 500 mL round bottom flask equipped with a water condenser were mixed with stirring the following compounds: methyl methacrylate (53 g), n-butyl acrylate (17 g), 4-acetoxystyrene (26 g), tert-dodecanethiol (0.2 g), and n-butanol (85 g). The mixture was then heated to about 100° C. and the stirring continued. A solution of initiator, azobisisobutyronitrile (AIBN) (3.0 g), dissolved in n-butanol (15 g) was prepared. This initiator suspension was added sequentially to the reaction mixture every 0.5 hour in three portions. The polymerization was complete after refluxing at 100° C. for four hours by determining the percent solids of the reaction mixture.

To the above resin solution was added FASCAT 4100 catalyst (0.2 g) and the mixture refluxed at 110° C. for 15 hours to complete the transesterification. To this mixture was added methyl n-amyl ketone (MAK) (43 g) and the temperature raised to 135° C. in order to distill off about 123 mL of the solvents. The resulting resin 2 was collected and determined to have about 70% solids.

Example 5—Synthesis of Control Resin 1

In a 500 mL round-bottom flask equipped with a water condenser were mixed with stirring the following compounds: methyl methacrylate (25 g), n-butyl acrylate (25 g), styrene (29.2 g), 2-hydroxyethyl methacrylate (18.6 g), tert-dodecanethiol (0.2 g), and methyl n-amyl ketone (MAK) (96 g). The mixture was then heated to about 100° C. and the stirring continued. A solution of initiator, azobisisobutyronitrile (AIBN) (2.0 g), dissolved in MAK (10 g) was prepared. This initiator suspension was added sequentially to the reaction mixture every 0.5 hour in three portions. The polymerization was complete after refluxing at 140° C. for three hr by determining the percent solids of the reaction mixture. About 71 mL of the solvent was then distilled off at 155° C. to give a resin with about 70% solids.

Example 6—Synthesis of Control Resin 2

In a 500 mL round-bottom flask equipped with a water condenser were mixed with stirring the following compounds: methyl methacrylate (15 g), n-butyl acrylate (15 g), styrene (48 g), 2-hydroxyethyl methacrylate (19 g), tert-dodecanethiol (0.2 g), and methyl n-amyl ketone (MAK) (85 g). The mixture was then heated to about 100° C. and the stirring continued. A solution of initiator, azobisisobutyronitrile (AIBN) (3.0 g), dissolved in MAK (15 g) was prepared. This initiator suspension was added sequentially to the reaction mixture every 0.5 hour in three portions. The polymerization was complete after refluxing at 110° C. for three hours by determining the percent solids of the reaction mixture. About 72 mL of the solvent was then distilled off at 160° C. to give a resin with about 70% solids.

Example 7—Preparation of Enamels

Enamels were prepared by adding the following components to 14.3 g of the various resins (70% solids): CYMEL 303 (American Cyanamid Co.) 2.5 g, NA-CURE 5076 (King Industries) 0.36 g, FLUORAD FC 430 (3M Co.) (20% in isopropanol) 0.2 g, and a solvent blend (methyl n-amyl ketone/xylene/EKTAPRO EEP (ethyl-3-ethoxy-propionate) (Eastman Chemical Co.)=70/15/15 by weight) 10 g. The mixtures were then agitated well to provide clear solutions.

Example 8—Preparation of Coatings

Coatings were prepared by applying various enamels to cold-rolled steel test panels (ACT 3×9×032 from Advanced Coating Technologies) and baking in an oven at 130° C. for 30 minutes. The thickness of the coating films was about 1.0 to 1.5 mil. The properties of various resins and coatings are listed in Table I and II. Molecular weights were estimated by gel permeation chromatography. Acid-etch resistance of the coatings was tested by adding a few drops of 10% sulfuric acid (e.g. six drops) onto the film surface of the coated panel and baking in an oven at 50° C., 60° C. or 70° C. for 0.5 hour. Other coating testings were carried out according to the following standard methods:

1. Film Thickness (Fisher Deltascope MP 2)
2. Solvent Resistance (MEK Double Rub, ASTM D1308)
3. Gloss (BYK-micro-gloss, ASTM D523)
4. Pencil Hardness (ASTM D3362)
5. Impact Resistance (BYK-Gardner Impact Tester, ASTM D2794)

TABLE I

| PROPERTY | Resin Properties | | | | |
| --- | --- | --- | --- | --- | --- |
| | RESIN 1 | RESIN 2 | RESIN 3 | CONTROL 1 | CONTROL 2 |
| Mn | 3800 | 3500 | 6700 | 1300 | 1400 |
| Mw | 23,000 | 19,000 | 25,000 | 48,000 | 17,000 |
| Tg (°C.) | 72 | 45 | 41 | 42 | 70 |

Mn: number average molecular weight
Mw: weight average molecular weight
Tg: glass transition temperature

TABLE II

| PROPERTIES | Coating Properties | | | | |
| --- | --- | --- | --- | --- | --- |
| | ENAMEL 1 | ENAMEL 2 | ENAMEL 3 | CONTROL 1 | CONTROL 2 |
| MEK double rubs | >200 | >200 | >200 | >200 | >200 |

TABLE II-continued

| PROPERTIES | Coating Properties | | | | |
|---|---|---|---|---|---|
| | ENAMEL 1 | ENAMEL 2 | ENAMEL 3 | CONTROL 1 | CONTROL 2 |
| gloss, 60°/20° | 100/95 | 99/95 | 97/86 | 99/91 | 103/94 |
| hardness | 4H | H | H | 4H | H |
| Impact resistance direct/reverse (lb-in.) | 20/<20 | <20/<20 | <20/<20 | 20/<20 | 20/<20 |
| 10% H$_2$SO$_4$, 50° C. | no effect | no effect | no effect | loss of gloss | loss of gloss |
| 10% H$_2$SO$_4$, 60° C. | no effect | blistering | blistering | loss of gloss film decomposed | loss of gloss film decomposed |
| 10% H$_2$SO$_4$, 70° C. | no effect | — | — | — | — |

Example 9—Synthesis of Water borne Resin

In a 500 mL round-bottom flask equipped with a water condenser were mixed with stirring the following compounds: methyl methacrylate (25 g), n-butyl acrylate (25 g), styrene (20 g), 4-acetoxystyrene (25 g), acrylic acid (2.57 g), tert-dodecanethiol (0.4 g), and n-butanol (85 g). The mixture was then heated to about 100° C. and the stirring continued. A solution of initiator, azobisisobutyronitrile (AIBN) (4.0 g), dissolved in n-butanol (15 g) was prepared. This initiator suspension was added sequentially to the reaction mixture every 0.5 hour in three portions. The polymerization was complete after refluxing at 100° C. for four hours by determining the percent solids of the reaction mixture.

To the above resin solution was added FASCAT 4100 catalyst (0.2 g) and the mixture refluxed at 11020 C. for 15 hours to complete the transesterification. To this mixture was added ethylene glycol monobutyl ether (EB) (43 g) and the temperature raised to 135° C. in order to distill off about 123 mL of the solvents. The resulting resin was collected and determined to have 67% solids.

Example 10—Preparation of Water-borne Enamel

To 14.9 g of the above resin (67% solids in EB) were added N,N-dimethylethanolamine (DMEA) (0.66 g) and distilled water (33 g). The mixture was stirred to give an aqueous dispersion. To this dispersion were added Cymel 303 (2.5 g) and FLUORAD FC 430 (20% in isopropanol, 0.2 g) to yield a water borne enamel. The enamel was applied onto test panels and cured at 175° C. for 30 min. The coating showed the following properties: gloss (60°/20°), 99/86; pencil hardness, 4H; impact resistance (direct/reverse), 40/<20; acid-etch resistance, 50° C.—no effect, 60° C.—blistering.

I claim:

1. An enamel composition comprising
  (I) about 25 to about 65 wt %, based on the total weight of components (I), (II) and (III), of a phenol functionalized vinyl polymer having a number average molecular weight of about 1000 to about 50,000 and a weight average molecular weight of about 5,000 to about 100,000, said phenol functionalized vinyl polymer prepared by polymerization of the following vinyl components:
    (a) about 5 to about 80 wt % of a 4-acyloxystyrene compound of Formula A,

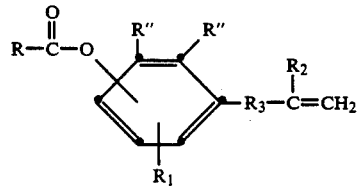

(A)

wherein R is selected from hydrogen, C$_1$–C$_6$-alkyl, C$_1$–C$_6$-alkoxy, C$_5$–C$_7$-cycloalkyl, aryl, aryloxy, C$_1$–C$_6$-alkylamino and arylamino; R$_1$ is selected from hydrogen, C$_1$–C$_6$-alkyl, C$_1$–C$_6$-alkoxy and halogen; R$_2$ is hydrogen or methyl; and R$_3$ is a covalent bond or is selected from a group of the formulae —(CHR')$_n$—, —O—, —S—, —C(O)—, —OC(O)—, —C(O)O—, —C(O)—O(CH$_2$)$_n$—O—C(O)—, and —NH—C(O)—, wherein R' is hydrogen or a group of the formula R—C(O)O-phenyl- or R—C(O)O-naphthyl; each R" is hydrogen or both R" are taken together to form a group of the formula

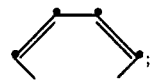

and n is an integer of from 1 to 10;
  (b) about 0 to about 50 wt % of a styrene compound of Formula B, and/or an acylated vinyl alcohol of Formula C,

(B)

$$CH_2=CH-O-\overset{O}{\underset{\|}{C}}-R$$

(C)

R, R$_1$ and R$_2$ are as defined above;
  (c) about 20 to about 90 wt % of an acrylate monomers of Formula D,

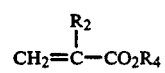

(D)

wherein R$_2$ is as defined above and R$_4$ is selected from C$_1$–C$_{12}$-alkyl; C$_5$–C$_7$-cycloalkyl; C$_1$–C$_{12}$-alkyl substituted by one or more groups selected from C$_1$–C$_6$-alkoxy, C$_5$–C$_7$-cycloalkyl, hydroxy, acetoacetoxy, aryl, furyl, tetrahydofuryl and —N(R$_5$)R$_6$ wherein R$_5$ and R$_6$ are independently selected from C$_1$-C$_6$-alkyl or hydrogen; and (d) about 0 to about 20 wt % of acrylic acid and/or methacrylic acid, said polymerization followed by transesterification with an alcohol to convert the acyloxyphenyl groups on the polymer to the phenol functionalized vinyl polymer;

(II) about 5 to about 20 wt % of an amino crosslinking agent, based on the total weight of (I), (II) and (III); and (III) about 20 to about 70 wt % of an organic solvent, based on the total weight of (I), (II) and (III).

2. The enamel composition of claim 1, wherein R$_3$ is a covalent bond or is selected from a group of the formulae —(CHR')$_n$—, —O—, —S—, —C(O)—, and —OC(O)—, wherein R' is hydrogen or a group of the formula R—C(O)-phenyl- and n is an integer of from 1 to 10.

3. The enamel composition of claim 1, wherein (a) is selected from the group consisting of 2-acetoxystyrene, 3-acetoxystyrene, and 4-acetoxystyrene.

4. The enamel composition of claim 1, wherein (b) is selected from the group consisting of styrene, vinyl acetate, and vinyl butyrate.

5. The enamel composition of claim 1, Wherein (b) is styrene.

6. The enamel composition of claim 1, wherein (c) is selected from the group consisting of methyl methacrylate, butyl acrylate, isobutyl methacrylate, lauryl methacrylate, 2-ethylheyl acrylate, 2- hydroxyethyl methacrylate, acetoacetoxypropyl methacrylate, acetoacetoxyethyl methacrylate, and glycidyl methacrylate.

7. The enamel composition of claim 1, wherein (c) is methyl methacrylate or butyl acrylate or a mixture thereof.

8. The enamel composition of claim i, wherein
(a) is 4-acetoxystyrene;
(b) is styrene;
(c) is methyl methacrylate or butyl acrylate or a mixture thereof; and
(d) is acrylic acid or methacrylic acid or a mixture thereof.

9. The enamel composition of claim 1, wherein the cross-linking agent is a compound having a plurality of —N(CH$_2$OR$^3$)$_2$ functional groups, wherein R$^3$ is C$_1$-C$_4$ alkyl.

10. The enamel composition of claim 1, wherein the crosslinking agent is selected from compounds of the following formulae, wherein R$^3$ is independently C$_1$-C$_4$ alkyl:

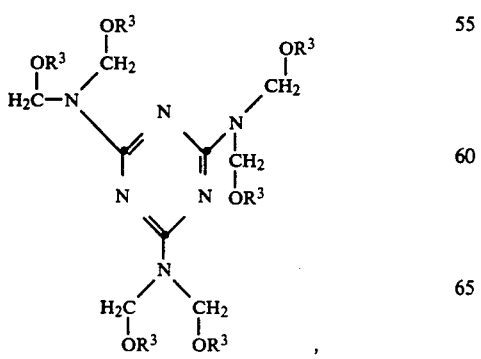

-continued

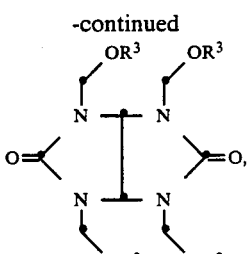

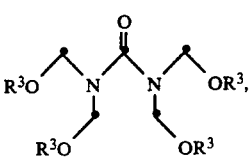

or

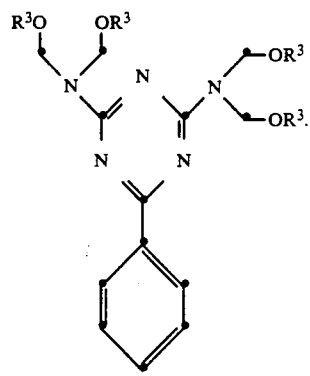

11. The enamel composition of claim 1, wherein the crosslinking agent is selected from hexamethoxymethylmelamine, tetramethoxymethylbenzoguanamine, tetramethoxymethylurea, and mixed butoxy/methoxy substituted melamines.

12. A water-borne enamel composition comprising
(I) about 25 to about 65 wt %, based on the total weight of components (I), (II), (III), (IV), and (V), of a phenol functionalized vinyl polymer having a number average molecular weight of about 1000 to about 50,000 and a weight average molecular weight of about 5,000 to about 100,000, said phenol functionalized vinyl polymer prepared by polymerization of the following vinyl components:

(a) about 5 to about 80 wt % of a 4-acyloxystyrene compound of Formula A,

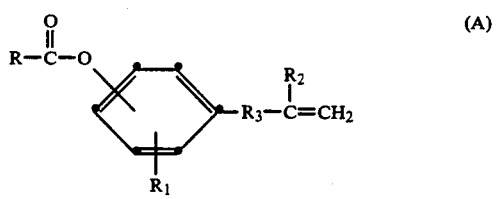

wherein R is selected from hydrogen, C$_1$-C$_6$-alkyl, C$_1$-C$_6$-alkoxy, C$_5$-C$_7$-cycloalkyl, aryl, aryloxy, C$_1$-C$_6$-alkylamino and arylamino; R$_1$ is selected from hydrogen, C$_1$-C$_6$-alkyl, C$_1$-C$_6$-alkoxy and halogen; R$_2$ is hydrogen or methyl; and R$_3$ is a covalent bond or is selected from a group of the formulae —(CHR')$_n$—, —O—, —S—, —C(O)—, —OC(O)—, —C(O)O—, —C(O)—O(CH$_2$)$_n$—O—C(O)—, and —NHC(O)—, wherein R' is hydrogen or a group of the formula R—C(O)O-phenyl-, or R—C(O)O-naphthyl; each R" is hydrogen or both R" are taken together to form a group of the formula

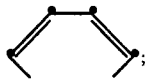

and n is an integer of from 1 to 10;

(b) about 0 to about 50 wt % of compound of Formula B, and/or an acylated vinyl alcohol of Formula C,

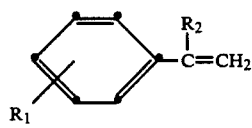

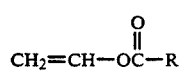

wherein R, R$_1$ and R$_2$ are as defined above;

(c) about 20 to about 90 wt % of an acrylate monomer of Formula D,

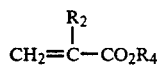

wherein R$_2$ is as defined above and R$_4$ is selected from C$_1$-C$_{12}$-alkyl; C$_5$-C$_7$-cycloalkyl; C$_1$-C$_{12}$-alkyl substituted by one or more groups selected from C$_1$-C$_6$-alkoxy, C$_5$-C$_7$-cycloalkyl, hydroxy, acetoacetoxy, aryl, furyl, tetrahydofuryl and —N(R$_5$)R$_6$ wherein R$_5$ and R$_6$ are independently selected from C$_1$-C$_6$-alkyl or hydrogen; and (d) about 0 to about 20 wt % of acrylic acid and/or methacrylic acid, said polymerization followed by tranesterification with an alcohol to convert the acyloxyphenyl groups on the polymer to the phenol functionalized vinyl polymer (I);

(II) about 0 to about 30 wt % of a water-miscible organic solvent, based on the total weight of I, II, III, IV and (V);

(III) about 30 to about 70 wt % of water, based on the total weight of (I), (II), (III), (IV) and (V);

(IV) about 5 to about 20 wt % of a crosslinking agent, based on the total weight of (I), (II), (III), (IV) and (V);

(V) about 0.5 to about 3 wt % of an amine, based on the total weight of (I), (II), (III), (IV), and (V), wherein said amine is reacted directly with said vinyl polymer (I).

13. The water borne enamel composition of claim 12, wherein R$_3$ is a covalent bond or is selected from a group of the formulae —(CHR')$_n$—, —O—, —S—, —C(O)—, and —OC(O)—, wherein R' is hydrogen or a group of the formula R—C(O)-phenyl- and n is an integer of from 1 to 10.

14. The water-borne enamel composition of claim 12, wherein (a) is selected from the group consisting of 2-acetoxystyrene, 3-acetoxystyrene, and 4-acetoxystyrene.

15. The water-borne enamel composition of claim 12, wherein (b) is selected from the group consisting of styrene, vinyl acetate, and vinyl butyrate.

16. The water-borne enamel composition of claim 12, wherein (b) is styrene.

17. The water-borne enamel composition of claim 12, wherein (c) is selected from the group consisting of methyl methacrylate, butyl acrylate, isobutyl methacrylate, lauryl methacrylate, 2-ethylhexyl acrylate, 2-hydroxyethyl methacrylate, and glycidyl methacrylate.

18. The water borne enamel composition of claim 12, wherein (c) is methyl methacrylate or butyl acrylate or a mixture thereof.

19. The water borne enamel composition of claim 12, wherein (d) is acrylic acid or methacrylic acid or a mixture thereof.

20. The water-borne enamel composition of claim 12, wherein (a) is 4-acetoxystyrene;
(b) is styrene;
(c) is methyl methacrylate or butyl acrylate or a mixture thereof; and
(d) is acrylic acid or methacrylic acid or a mixture thereof.

21. The enamel composition of claim 12, wherein the cross-linking agent is a compound having a plurality of —N(CH$_2$OR$^3$)$_2$ functinal groups, wherein R$^3$ is C$_1$-C$_4$ alkyl or hydrogen.

22. The water-borne enamel composition of claim 12, wherein the croslinking agent is selected from compounds of the following formulae, wherein R$^3$ is independently C$_1$-C$_4$ alkyl or hydrogen:

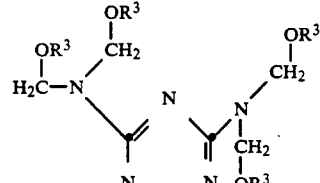

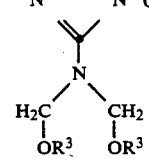

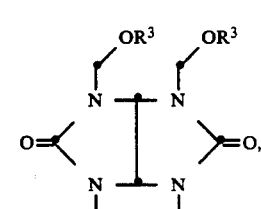

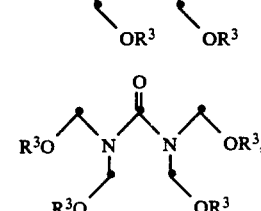

or

-continued

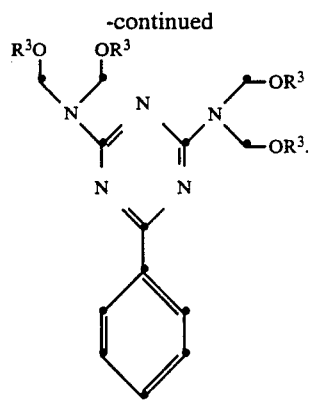

23. The water-borne enamel composition of claim 12, wherein the crosslinking agent is selected from hexamethoxymethylmelamine, tetramethoxymethylbenzoguanamine, tetramethoxymethylurea, and mixed butoxy/methoxy substituted melamines.

24. A shaped or formed article coated with the cured composition of claim 1.

25. A shaped or formed article coated with the cured composition of claim 12.

* * * * *